(12) United States Patent
McIntyre

(10) Patent No.: US 11,021,207 B2
(45) Date of Patent: Jun. 1, 2021

(54) BICYCLE BRAKE

(71) Applicant: John McIntyre, Traverse City, MI (US)

(72) Inventor: John McIntyre, Traverse City, MI (US)

( * ) Notice: Subject to any disclaimer, the term of this patent is extended or adjusted under 35 U.S.C. 154(b) by 83 days.

(21) Appl. No.: 16/192,312

(22) Filed: Nov. 15, 2018

(65) Prior Publication Data

US 2020/0156734 A1    May 21, 2020

(51) Int. Cl.
*B62L 1/16* (2006.01)
*B62L 1/00* (2006.01)

(52) U.S. Cl.
CPC ............... *B62L 1/16* (2013.01); *B62L 1/005* (2013.01)

(58) Field of Classification Search
CPC ...... F16D 55/2245; F16D 49/16; F16D 65/18; F16D 65/095; F16D 2055/0062; F16D 2069/0433; F16D 2121/14; B60T 1/06; B62L 1/00; B62L 1/005; B62L 1/16
USPC ..................... 188/24.21, 24.11–24.15, 24.22
See application file for complete search history.

(56) References Cited

U.S. PATENT DOCUMENTS

| | | | |
|---|---|---|---|
| 4,597,474 A * | 7/1986 | Nagano | B62L 1/16 188/24.21 |
| 4,768,623 A | 9/1988 | Nagano | |
| 5,775,466 A * | 7/1998 | Banyas | B62L 1/14 188/24.21 |
| 6,155,383 A | 12/2000 | Sugimoto | |
| 2009/0229929 A1 * | 9/2009 | Towle | B60T 11/046 188/24.19 |

* cited by examiner

*Primary Examiner* — Robert A. Siconolfi
*Assistant Examiner* — San M Aung

(57) ABSTRACT

A linear brake for a bicycle comprises a pair of pivot mounts, each of which is mounted on a bicycle member laterally of a wheel rim, one on either side of the wheel. A brake arm is pivotally mounted in levered relation on each pivot mount below adjacent and biased away from the wheel rim. A brake shoe is affixed to each brake arm upper end. A control cable is affixed to a control member above the wheel with the control member being connected to the center of a yoke cable. The yoke cable is affixed to the lower end of each brake arm with yoke cable passed partway around the annular component on each pivot mount.

1 Claim, 1 Drawing Sheet

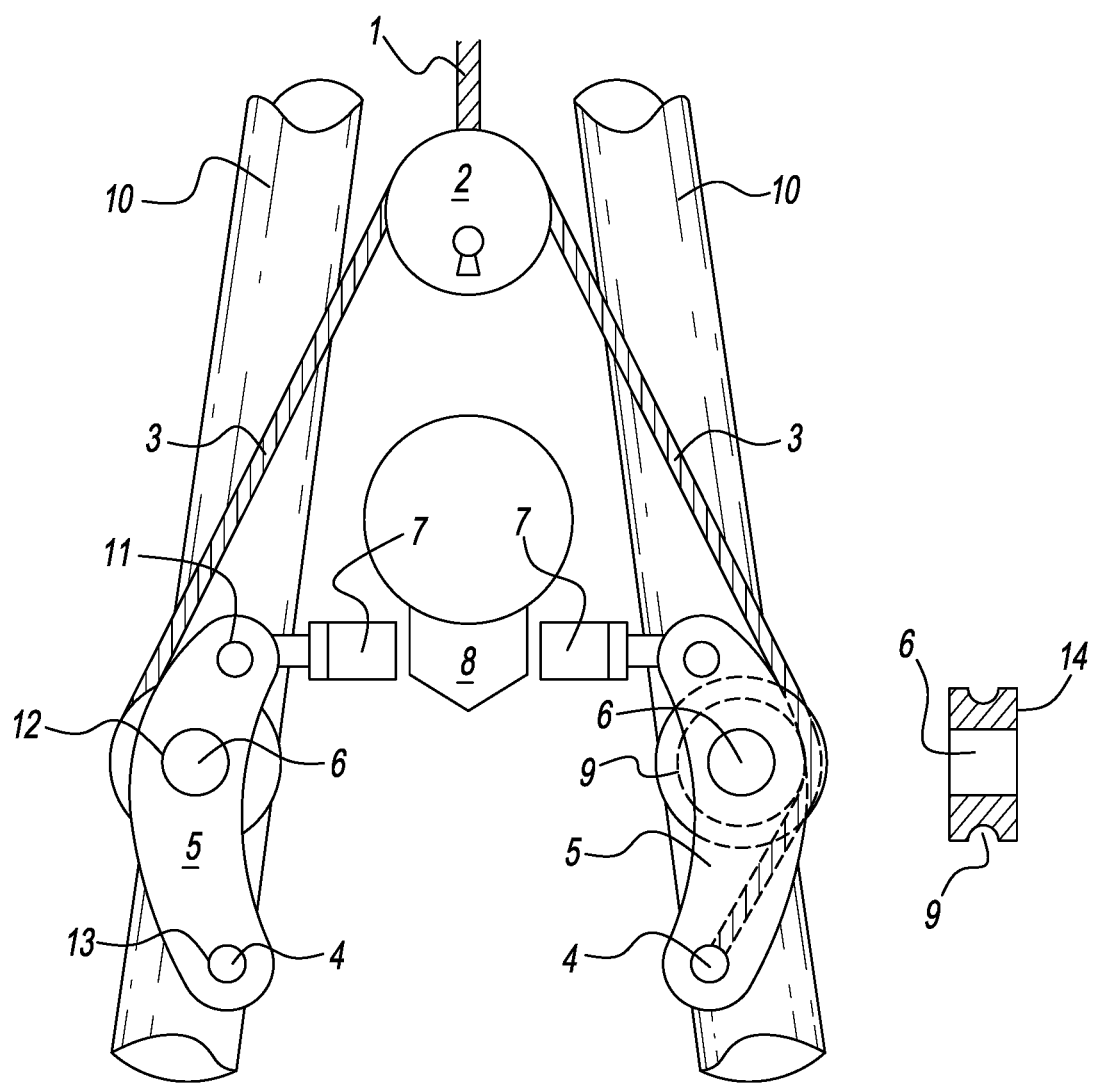

BICYCLE BRAKE

FIELD OF THE INVENTION

The invention is in the field of bicycle brakes, and more particularly bicycle brakes of the linear type.

BACKGROUND OF THE INVENTION AND DESCRIPTION OF THE RELATED ART

The current field of bicycle brake types are numerous with considerable intellectual property protection granted through issued patents. Traditional center-pull and side-pull brakes although improved have been superseded in many applications by linear brakes, some known as "V" brakes and cantilever brakes as disclosed in U.S. Pat. Nos. 4,768,623 and 6,155,383. Regarding these patents and resulting commercialization, some cyclists contend these specific brakes are too powerful, have long travel of the handlebar mounted brake lever for brake actuation, can cause premature wear of the wheel rim and sometimes even dangerous riding conditions. Unlike the invention, the cables in the abovementioned brake assemblies for actuation are connected in proximities at or above the pivoting member with brake pads installed near or below said connection. Moreover unlike the invention, cantilever assemblies protrude from the proximity of the bicycle's front fork and rear frame assembly attachment. The invention benefits from shortened brake lever manipulation while exerting consistent pressure upon the bicycle wheel rim, lessened wheel rim wear, and controlling braking power and decreasing issues jeopardizing cyclist safety.

BRIEF SUMMARY OF THE INVENTION

The present invention comprises a linear style bicycle brake having a brake arm and pivot mount with provisions for actuating cable and brake shoe attachment. The purpose of the invention is to offer cyclists with a simpler linear style brake that provides less wear and tear upon the bicycle wheel rim, smooth and safer brake actuation in a relatively compact configuration.

In the illustration of the preferred embodiment of the invention is the relationship of the key elements being the brake pad, pivot mount, and the yoke cable attachment.

Shown in the illustrative embodiment of the invention's brake arm assembly is the location of the key elements.

As will be understood from the following specification, the bicycle brake can be constructed using composites and/or metals ranging from aircraft grade aluminum, steel, and exotic materials such as titanium alloys.

These and other features and advantages of the invention will become apparent from the detailed description below, in light of the accompanying drawing.

BRIEF DESCRIPTION OF THE DRAWINGS

FIG. 1 is a front view of an embodiment of the linear brake of the invention which includes a sectional view of a component.

DETAILED DESCRIPTION OF THE INVENTION

It is fully understood that a linear bicycle brake is activated by a handlebar mounted brake lever as the invention. It is also fully understood the invention as with all center-pull bicycle brakes, has a frame mounted component to secure a control cable (1) shown in FIG. 1. Continuing to reference FIG. 1, the brake arm (5) has its pivot mount (6) attached to a bicycle member (10) such as the fork and/or seat stays. Note the strategic placement of the following components on the brake arm (5), the brake shoe (7), the pivot mount (6) and the secure position for yoke cable (4). When the brake lever is squeezed: the control cable (1) raises the control member (2) that cradles and lifts the yoke cable (3), raising the yoke cable (3) secured in the position (4) of the brake arm (5) which as a result of the pivot mount (6) forces the brake shoe (7) against the bicycle wheel rim (8) facilitating braking. Note that the yoke cable (3) rests inside a groove or annular component (9) of the outside diameter of the pivot mount (6). The location of the annular component (9) creates leverage and guidance of the yoke cable (3). Not shown is a spring that retracts the brake arm to the original stand-by position as illustrated.

Again referring to FIG. 1, the brake arm (5) has provisions shown for the installation (11) of the brake shoe (7), installation (12) of the pivot mount (6) and installation (13) of the yoke cable (3) elements. Note location of each element on the brake arm (5). The pivot mount (6) has a groove or annular component (9) routing the yoke cable (3) and increasing the mechanical advantage of the brake when actuated. Also shown, is a groove provided to modify a bushing (14) to comprise the annular component (9). The bushing (14) has an inside diameter approximating the outside diameter of the pivot mount (6) and allows free rotation and decreased frictional contact of the yoke cable (3). Varying the outside diameter of the annular component of the pivot mount (6) or the modified bushing (14) can increase or decrease braking power. Conceptually, the brake arm (5) could be secured in place by extending the shaft on the pivot mount (6) providing a through hole for a quick release pin (not shown) eliminating the need for tools to remove the brake arm (5). Such variation would also allow the relaxing of the yoke cable (3) for facilitating wheel removal and servicing.

It will finally be understood that the disclosed embodiments represent presently preferred forms of the invention, but are intended to be explanatory rather than limiting of the invention. Reasonable variation and modification of the invention as disclosed in the foregoing disclosure and drawings are possible without departing from the scope of invention. The scope of the invention is defined by the following claim.

What is claimed is:

1. A linear brake for a bicycle comprising a pair of pivot mounts, each of which is mounted on a bicycle member laterally of a wheel rim, one on either side of the wheel, a brake arm pivotally mounted in levered relation on each pivot mount with, a control cable affixed to control member above the wheel, the control member connected to the center of a yoke cable affixed to the lower end of each brake arm, a groove in a discoidal machine element affixed on each pivot mount and yoke cable situated partway around the groove.

* * * * *